United States Patent
Muttur et al.

(10) Patent No.: US 9,588,831 B2
(45) Date of Patent: Mar. 7, 2017

(54) PREVENTING RECURRENCE OF DETERMINISTIC FAILURES

(71) Applicant: Lenovo Enterprise Solutions (Singapore) Pte. Ltd., Singapore (SG)

(72) Inventors: Manjunath B. Muttur, Kolar Gold Fields (IN); Alexander J. Stundzia, Rochester, MN (US); Deepti S. Umarani, Belgaum (IN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 79 days.

(21) Appl. No.: 14/599,049

(22) Filed: Jan. 16, 2015

(65) Prior Publication Data

US 2016/0210180 A1    Jul. 21, 2016

(51) Int. Cl.
*G06F 11/00* (2006.01)
(52) U.S. Cl.
CPC ...... *G06F 11/004* (2013.01); *G06F 2201/805* (2013.01); *G06F 2201/86* (2013.01)
(58) Field of Classification Search
USPC .......................................................... 714/3
See application file for complete search history.

(56) References Cited

U.S. PATENT DOCUMENTS

| 7,082,555 B2 | 7/2006 | Toyooka et al. |
| 7,478,264 B1* | 1/2009 | Schlomer ................ H04L 45/00 714/4.1 |
| 7,788,540 B2 | 8/2010 | Merriman et al. |
| 2010/0125749 A1* | 5/2010 | Tanaka ................ G06F 11/0709 714/4.2 |
| 2014/0149783 A1* | 5/2014 | Georgiev ............ G06F 11/0793 714/4.2 |
| 2015/0143159 A1* | 5/2015 | Balogh ................ G06F 11/2007 714/4.11 |

FOREIGN PATENT DOCUMENTS

JP    5427761 B2    2/2014

* cited by examiner

*Primary Examiner* — Sarai Butler
(74) *Attorney, Agent, or Firm* — Patterson & Sheridan, LLP

(57) ABSTRACT

Systems, methods, and computer program products to perform an operation comprising receiving, by a management console managing a server, a request to perform an operation on the server, determining that performance of the operation is associated with a deterministic failure in the server, and blocking performance of the operation by the management console, thereby preventing an occurrence of the deterministic failure in the server.

20 Claims, 6 Drawing Sheets

PREVENTING RECURRENCE OF DETERMINISTIC FAILURES

BACKGROUND

The present disclosure relates to computer software, and more specifically, to computer software to prevent recurrence of deterministic failures.

Providers of computing services often need to ensure that downtime is minimized. Providers can typically overcome or avoid hardware failures using redundancy features, concurrent maintenance, and other techniques. On the other hand, software failures may severely reduce system availability. Often, providers attempt to survive software failures by restarting applications on the same or different servers, or by relocating the application (or its virtual machine) to another compute node in the computing environment. However, these techniques may not suffice, as some types of software failures may persist when using by restarting or relocating applications.

SUMMARY

Aspects disclosed herein include systems, methods, and computer program products to perform an operation comprising receiving, by a management console managing a server, a request to perform an operation on the server, determining that performance of the operation is associated with a deterministic failure in the server, and blocking performance of the operation by the management console, thereby preventing an occurrence of the deterministic failure in the server.

DETAILED DESCRIPTION

Figure 1:
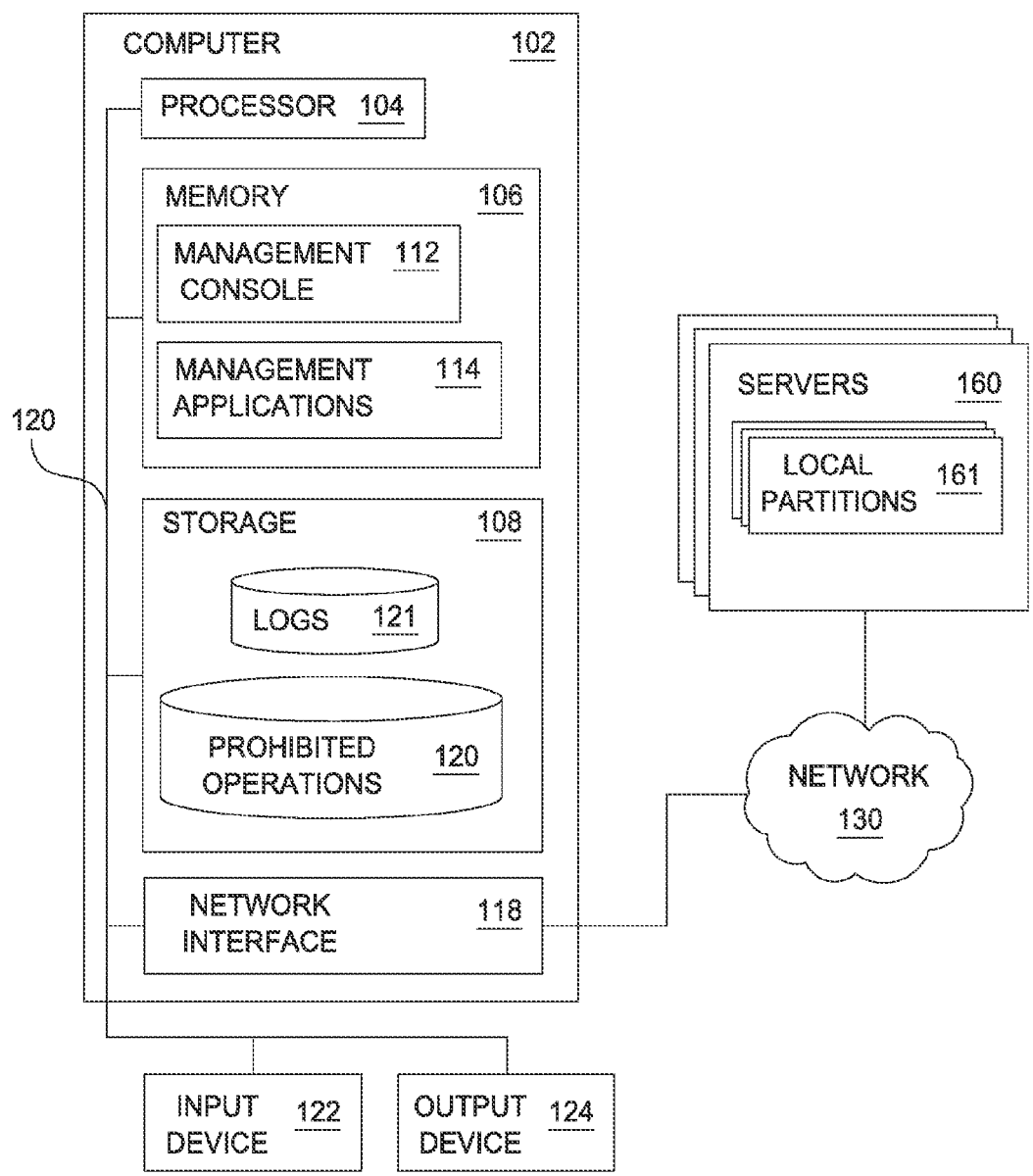
FIG. 1 illustrates a system to prevent recurrence of deterministic failures, according to one aspect.

Embodiments presented herein provide techniques for preventing users or applications from performing operations that are known to result in failures. When a failure is first encountered, a management console may record each operation that led to the failure, and store the operation as a prohibited operation in a data store. When a subsequent request is issued to perform the operation, the management console may reference the data store to determine that the operation is prohibited, and block performance of the operation.

To maintain a high availability of services in a computing cluster, a provider may use a set of management applications. As used herein, the term "management application" refers to any application that manages workloads, services, applications, and/or logical partitions (or virtual machines). For example, management applications may include, without limitation, applications to remotely restart, migrate, or clone services and/or logical partitions in the cluster. Specific examples of management applications include, without limitation, VMcontrol, Workload Deployment Manager, Smart Cloud Entry, Systems Director, and PowerVC by International Business Machines®.

In many cases, the management applications interact with a management console to perform their intended operations. Generally, a management console refers to an application that provides an interface for configuring and operating partitioned (or virtualized) systems, as well as managing the physical and virtual resources of the systems. One example of a management console is the Hardware Management Console by International Business Machines®. The management console may allow system administrators (or the management applications) to manage the software configuration and operation of partitions in a server system, as well as to monitor and identify problems. For example, the management console may be used to configure and manage logical partition profiles, perform dynamic logical partitioning (DLPAR) operations, and activate and manage capacity on demand resources.

When a user, the management applications, or the management console perform operations, these operations may lead to hardware and/or software failures, reducing the availability of services provided by the computing cluster. Generally, software failures may be categorized into two types, namely deterministic failures and non-deterministic failures. As used herein, a "deterministic failure" refers to failures that may consistently be exposed by following specific paths, steps, or code flow, such that the failure can be easily recreated. A "non-deterministic" failure refers to failures which can happen at any time, and are not easily recreated, such as memory corruption, miscompares, and timing/serialization issues.

Non-deterministic failures are often remedied by restarting services or relocating services to different servers. However, deterministic failures may recur with these techniques, as users or applications may continue to perform the same actions without knowledge that these actions caused the deterministic failure. As such, the management console may identify the offending actions that cause deterministic failures. The management console may maintain a data store including each prohibited (or otherwise unsupported) operation. The management console may then prohibit those operations from being subsequently performed, regardless of the requesting party (such as the user, a management application, or the management console itself).

Example system management operations include, without limitation, DLPAR operations, hibernation operations, relocation operations, and the like. For example, a user may initiate a DLPAR operation on a logical partition, which may cause the logical partition to crash due to a defect in the memory management logic of the logical partition. When the failure occurs, the management console may identify the steps that caused the failure (in this case, invocation of the memory management logic). An indication that the memory management logic is flawed may then be stored by the management console. When subsequent calls are made to the memory management logic, the management console may prohibit the call from being performed. Sometimes, these offending calls may be made inadvertently by a user, automatically by the management console, or by some other operation (such as page migration, affinity changes, and the like). Regardless of the entity making the call to the flawed memory management logic, the management console will prevent the call from being made, and therefore prevent the memory management logic from causing a recurrence of the same failure.

FIG. 1 illustrates a system 100 to prevent recurrence of deterministic failures, according to one aspect. The networked system 100 includes a computer 102 connected to other computers via a network 130. In general, the network 130 may be a telecommunications network and/or a wide area network (WAN). In a particular embodiment, the network 130 is the Internet. In at least one aspect, the system 100 is a cloud computing cluster where servers 160 host logical partitions 161 (or virtual machines) that provide services (not pictured) to clients.

The computer 102 generally includes a processor 104 which obtains instructions and data via a bus 120 from a memory 106 and/or a storage 108. The computer 102 may also include one or more network interface devices 118, input devices 122, and display devices 124 connected to the bus 120. The computer 102 is generally under the control of an operating system (not shown). Examples of operating systems include the UNIX® operating system, versions of the Microsoft® Windows® operating system, and distributions of the Linux® operating system. (UNIX® is a registered trademark of The Open Group in the United States and other countries. Microsoft® and Windows® are trademarks of Microsoft Corporation in the United States, other countries, or both. Linux® is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. Furthermore, the input device 122 may include a set of buttons, switches or other physical device mechanisms for controlling the computer 102. The display device 124 may include output devices such as monitors, touch screen displays, and so on.

As shown, the memory 106 contains the management console 112, which is an application that provides an interface for configuring and operating partitioned (or virtualized) systems, such as the logical partitions 161 on the servers 160. The management console 112 is further configured to prevent prohibited actions or operations from being performed when those actions or operations have previously been observed to cause deterministic failures in the servers 160 and/or the logical partitions 161. When a deterministic failure is first encountered, the management console 112 may identify, in the logs 121, steps or actions taken that led to the deterministic failure. The management console 112 may then store an indication of the identified actions in the prohibited operations 120. In at least some aspects, the management console 112 may present the operations identified in the logs 121 to a user, who may then refine or edit the operations in order to create an entry in the prohibited operations 120. In addition, a user may manually define one or more operations as being prohibited in the prohibited operations 120 without first encountering a deterministic failure.

When a user or management application 114 subsequently requests to perform an operation, the management console 112 may reference the prohibited operations 120 in order to determine whether the requested operation is associated with a deterministic failure. If the requested operation is associated with a deterministic failure, the management console 112 does not permit performance of the requested operation, preventing the failure. The management console 112 may notify a user requesting the operation that the operation is blocked and will not be performed.

In some aspects, the system 100 may include multiple computers 102 executing instances of the management console 112, such as in the case of a cloud computing environment or computing cluster. In such cases, a first management console 112, when storing an indication of a prohibited operation in the prohibited operations 120, may share the indication with other instances of the management console 112 executing in the system. Doing so allows the management consoles 112 to share information related to deterministic failures, and prevent those operations from being performed anywhere in the system 100.

In many cases, a fix for operations associated with deterministic failures may be created. In such a case, if the fix remedies the issue such that the operation is no longer associated with a deterministic failure, a user or the management console 112 may update the prohibited operations 120 such that the operation is no longer prohibited. The management console 112 may update the prohibited operations 120 in response to installation of the fix. Once the prohibited operation is fixed, the management console 112 does not block the operation from being performed. For example, the previously discussed flawed memory management logic may be updated so that the memory management logic now functions properly. When the fix is made to the memory management logic, the management console 112 (or a user) may update prohibited operations 120 such that the flawed memory management logic is no longer associated with a deterministic failure. When a subsequent call is made to the memory management logic, the management console allows the memory management logic to perform its requested function. Generally, even in the absence of installing a fix, a user may remove operations from the prohibited operations 120, allowing the removed operations to be subsequently performed.

In addition to operations associated with failures, the management console 112 may also prevent unsupported operations from being performed. For example, if a user requests to add eight processors to a logical partition 161, but the customer's service level agreement only provides up to four processors, the management console 112 may block the request to add eight processors to the logical partition. Similarly, if an operation is not supported by a particular deployment, the management console 112 may block that operation. Doing so allows users to avoid the need to reference lists of unsupported features and/or operations currently provided in system documentation.

The management applications 114 are systems management applications that manage workloads, services, applications, and/or logical partitions (or virtual machines). In many cases, the operations performed by the management applications 114 are executed by automated scripts or web interfaces to the management console 112. The management applications 114 may perform activities such as load balancing using DLPAR, deploying new logical partitions 161, configuration changes, optimization through affinity changes, relocation of logical partitions 161 on the servers 160, and the like. However, these operations may lead to deterministic failures. When identified, the management console 112 may identify these operations in the prohibited operations.

As shown, the storage 108 includes a reference to prohibited operations 120 and the logs 121. The prohibited operations 120 indicate what operations are known to cause deterministic failures in the servers 160 and/or logical partitions 161 (and/or any services hosted thereon). The operations may include any types of operations that may result in a failure, and if repeated, will recreate the same failure (generally referred to as deterministic failures). One example of such operations are systems management operations, which may comprise operations performed by the management console 112 and/or the management applications 114. The prohibited operations 120 may also specify unsupported operations in the servers 160 and/or logical partitions 161. When the management console 112 receives a request to perform an operation, the management console 112 may first reference the prohibited operations 120. If the management console 112 determines a requested operation is prohibited and/or unsupported, the management console 112 blocks performance of that operation. In one aspect, data in the prohibited operations 120 includes, the type of failure triggered by the operation, under what conditions the failure is triggered, and how the failure can be avoided. In addition, the prohibited operations 120 may specify a class of the specified failure. Examples of classes of failure include transient failures, permanent failures, recoverable failures, unrecoverable failures, and cosmetic failures. A transient failure may be a failure that occurs only for certain input values while invoking a function of the system. A permanent failure may occur for all input values while invoking a function of the system. A recoverable failure is a failure that, upon occurrence, the system recovers with or without operator intervention. An unrecoverable failure is a failure that requires a restart of the system in order to be corrected. A cosmetic failure is a class of failure that causes minor errors, and does not lead to incorrect results.

The management console 112 may tailor an action taken for a given operation based on the associated class of failure. For example, the management console 112 may warn a user that an operation requested is expected to result in a cosmetic failure. Because the cosmetic failure does not lead to incorrect results, the user may approve the operation. However, for other classes of errors, the management console 112 does not allow the user to override the block on performing the operation.

The logs 121 stores a list of the operations performed by the management console 112 and/or the management applications 114. In at least one aspect, the management console 112 writes each operation it performs (or allows to be performed) to the logs 121. By maintaining a list of operations in the logs 121, the management console 112 identifies the most recent operations that lead to failures. In such cases, the management console 112 may store the operations in the prohibited operations 120, such that the management console 112 can prevent the errors from recurring by blocking requests to perform those operations.

Figure 2:
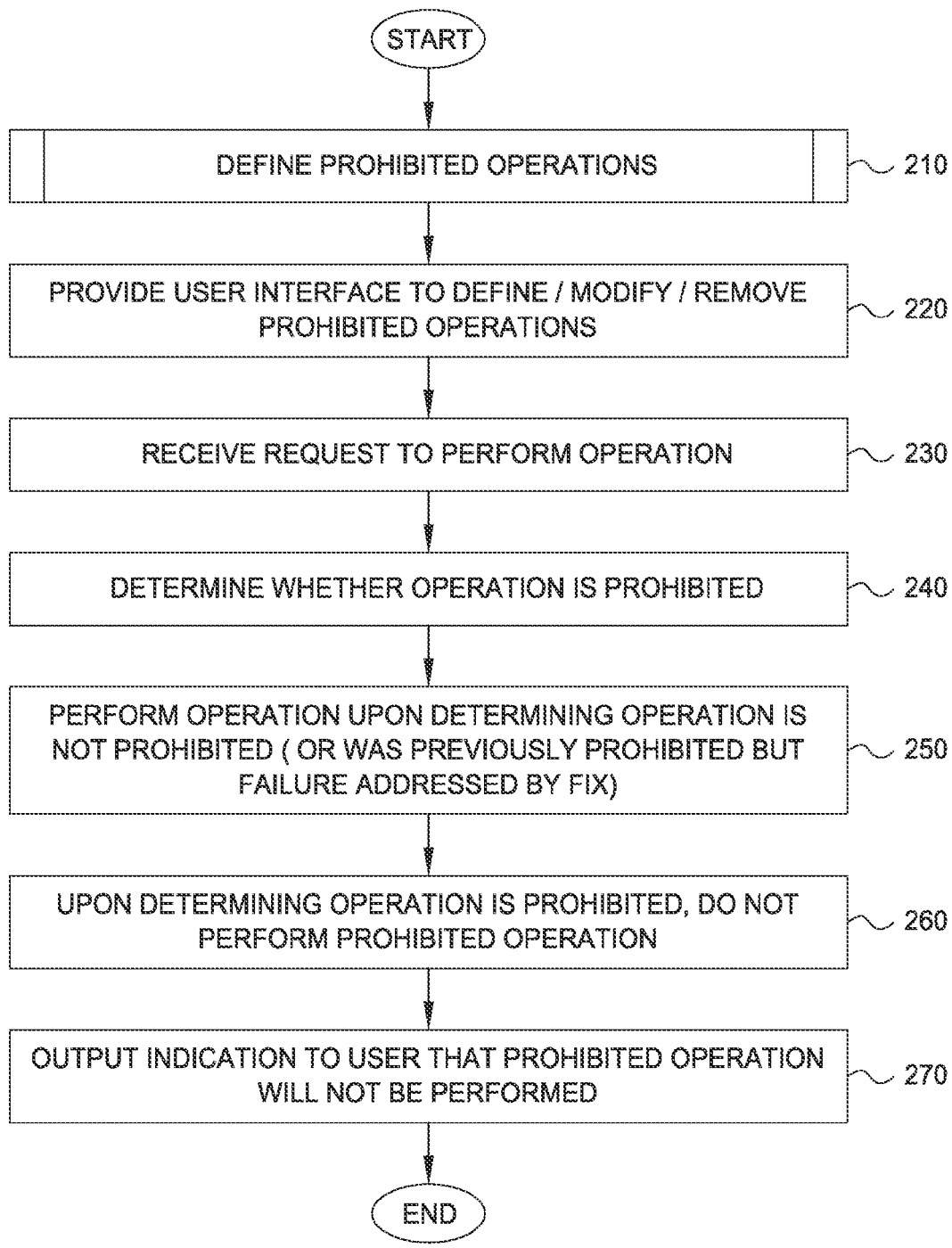
FIG. 2 illustrates a method to prevent recurrence of deterministic failures, according to one aspect.

FIG. 2 illustrates a method 200 to prevent recurrence of deterministic failures, according to one aspect. Generally, the steps of method 200 prohibit operations from being performed if those operations known to cause a deterministic failure. For example, in a cloud computing environment, the management console 112 may constantly migrate resources, deploy new resources, and the like, all of which occurs transparently to a user. If a software bug is associated with migrating a logical partition that can potentially disable a target node, the management console 112 may trigger this error with each migration of the logical partition. In such a scenario, it s not practical to shut down the entire cloud operation just to contain a failure caused by a specific activity associated with the logical partition. Instead, the management console 112 may block the activity associated with the logical failure, in this case migrating the offending logical partitions to new servers or nodes.

At step 210, the management console 112 (or a user) may define prohibited operations. Prohibited operations generally correspond to operations identified as causing deterministic failures, or as not being supported. The operations are stored in the prohibited operations 120. At step 220, the management console 112 may provide a user interface to define, modify, and/or remove operations from the prohibited operations 120. For example, the management console 112 may allow a user to remove an entry in the prohibited operations 120 corresponding to an operation that has been fixed by a software update. At step 230, the management console 112 may receive a request to perform an operation. The operation may be any type of operation, such as a DLPAR operation, hibernation operation, relocation operation, and the like.

At step 240, the management console 112 may determine whether the operation is prohibited by referencing the prohibited operations 120. At step 250, the management console 112 may perform the operation upon determining the operation is not prohibited, or was previously prohibited but the failure the operation caused has now been addressed by a software update. At block 260, the management console 112 blocks performance of the requested operation upon determining that the operation is defined as a prohibited operation in the prohibited operations 120. At block 270, the management console 112 may output an indication to the user that the prohibited operation will not be performed.

Figure 3:
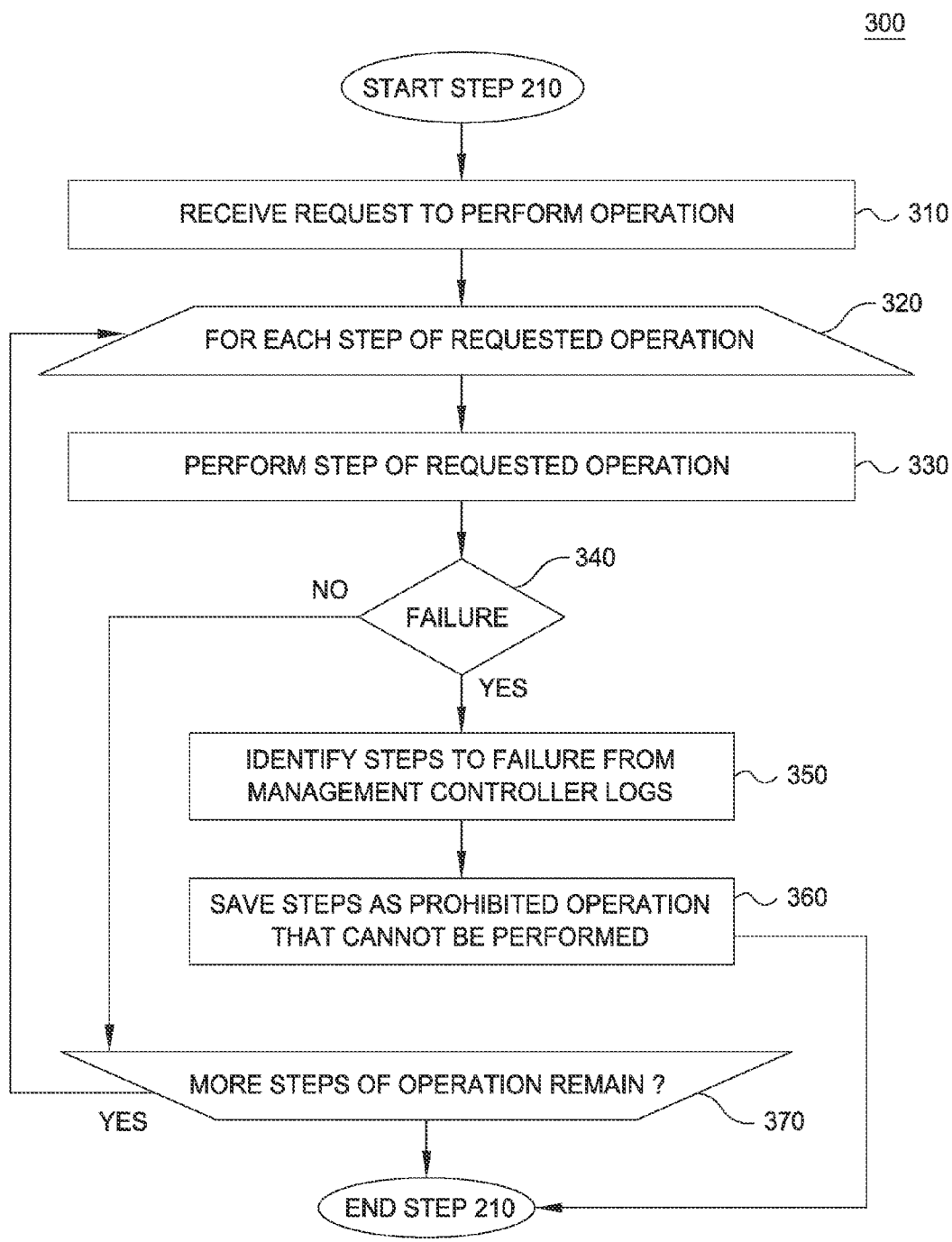
FIG. 3 illustrates a method to define prohibited operations, according to one aspect.

FIG. 3 illustrates a method 300 corresponding to step 210 to define prohibited operations, according to one aspect. Generally, the steps of the method 300 identify prohibited operations that trigger deterministic failures on a server hosting one or more logical partitions. The method begins at step 310, where the management console 112 receives a request to perform an operation. At step 320, the management console 112 performs a loop including steps 330-370 for each step of the requested operation. At step 330, the management console 112 performs the current step of the requested operation. At step 340, the management console 112 determines whether a deterministic failure has occurred. In at least one aspect, the management console 112 may determine that a deterministic failure has occurred by monitoring an "activity/code path" once the failure is determined for the first time. Generally, if a set of operations (or activities), when performed, result in a failure having the same failure profile (which may include an error code, type of error, and the like), the management console 112 can determine that the operations result in a deterministic failure.

For example, if a user attempts to add an operation to add 10 GB of memory to a machine, the user may follow specific steps to add the memory to the machine. If the operation results in a failure, the management console 112 may trace back the list of steps followed by the user (from the logs 120)

before the failure, and save the steps in the prohibited operations 121 as a "suspected operation" along with a failure signature, which may include metadata such as an error code, type of error, and the like. Whenever this suspected operation is performed again (i.e., adding 10 GB of memory), if the same failure with the same failure signature (error code, type of error, etc.) is encountered, the management console 112 will determine that the failure is a deterministic failure, and update the prohibited operations 121 to reflect that the suspected operation is now a prohibited operation. Returning to step 340, if a failure has not occurred, the management console 112 proceeds to step 370, where the management console 112 determines whether more steps in the operation remain. If more steps remain, the management console 112 returns to step 320. If no more steps remain in the operation, the method 300 ends.

Returning to step 340, if a deterministic failure has occurred, the management console 112 identifies the steps taken that caused the failure from the logs 120 (step 350). At step 360, the management console 112 may save the steps identified from the logs 120 as an operation in the prohibited operations 120 that cannot be performed until the operation no longer causes the deterministic failure. Method 300 concludes once the management console 112 saves the operation to the prohibited operations 120.

Advantageously, aspects disclosed herein prevent repeat occurrences of deterministic failures in a computing cluster. The management console 112 may identify operations that trigger deterministic failures, and store these operations as prohibited operations that cannot be repeated until a fix is applied (or the operations are otherwise removed from the prohibited operations 120). When receiving a request to perform an operation, the management console 112 may first determine whether the operation is defined as a prohibited operation. If the operation has been prohibited, the management console 112 will block performance of the operation. In some aspects, the management console 112 may also inform a user that performance of the operation has been blocked.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
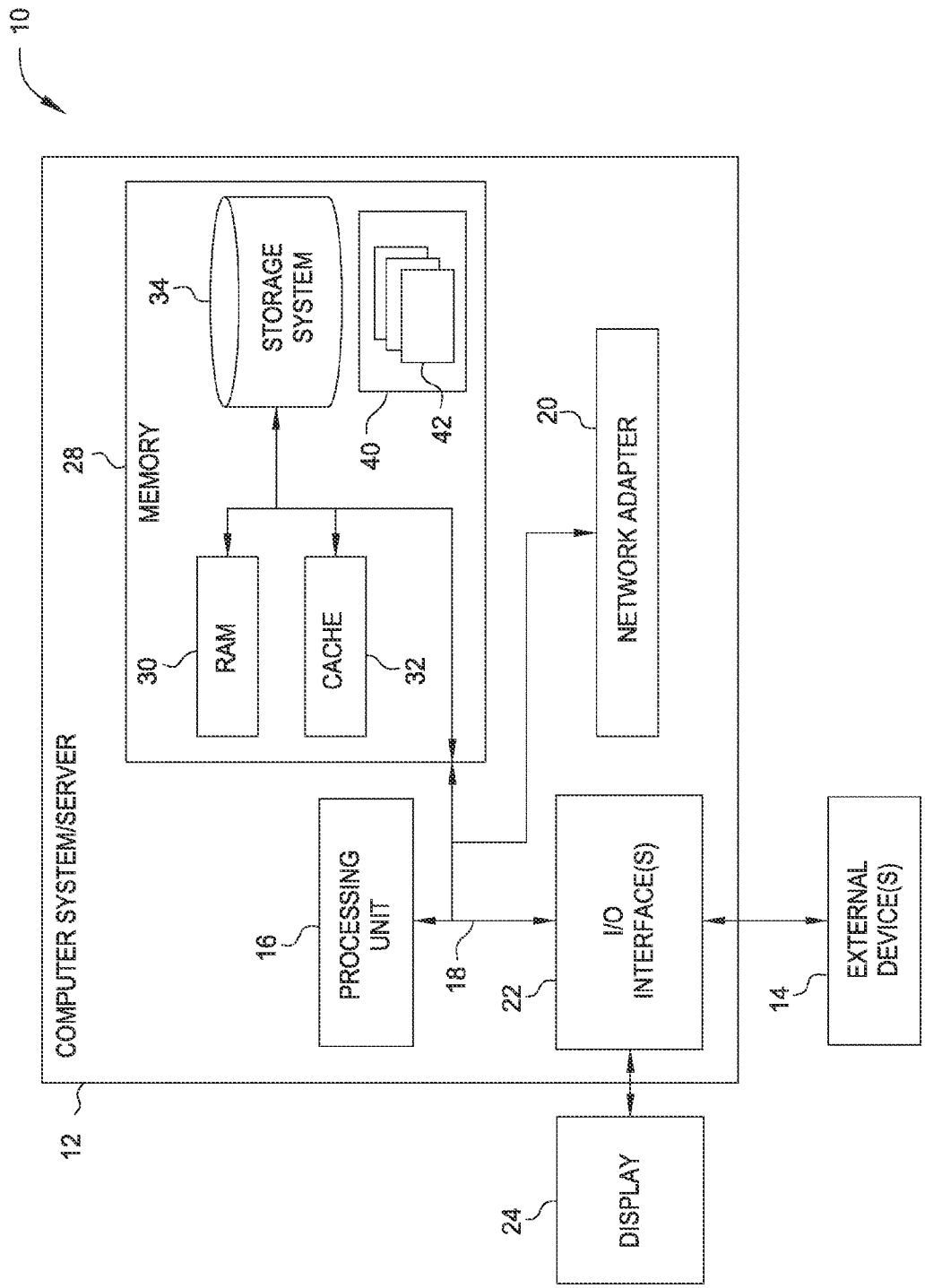
FIG. 4 depicts a cloud computing node, according to one aspect.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
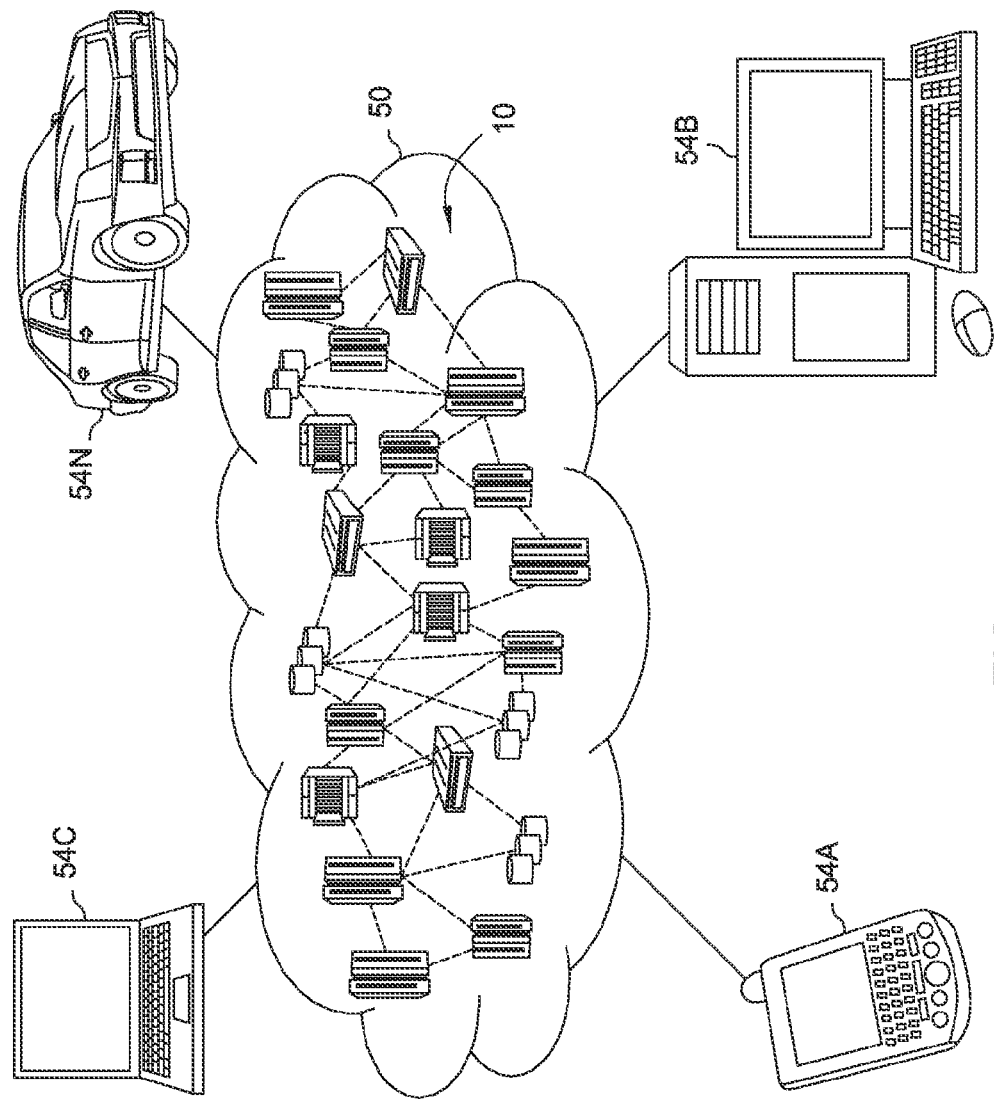
FIG. 5 depicts a cloud computing environment, according to one aspect.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
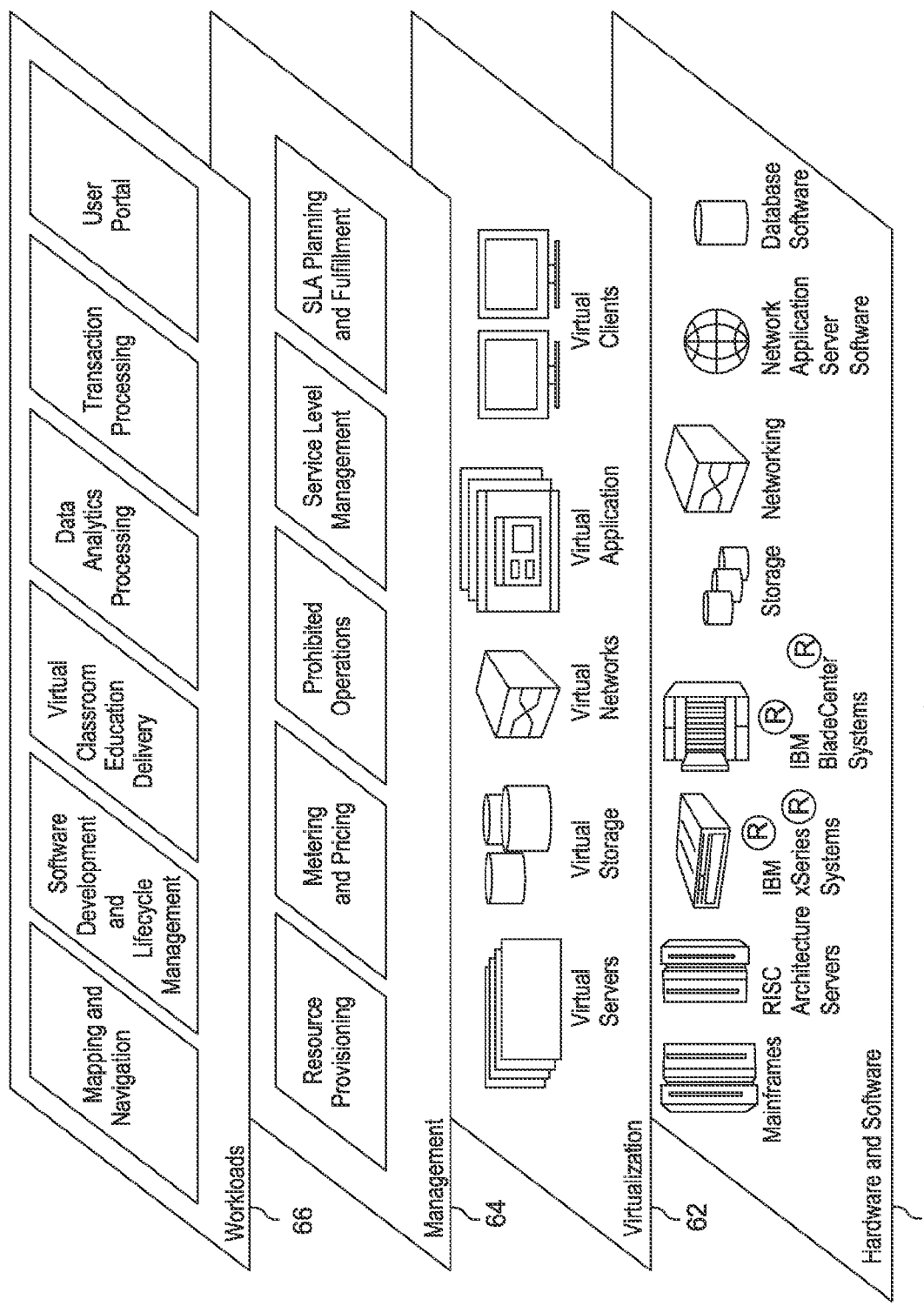
FIG. 6 depicts abstraction model layers, according to one aspect.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Prohibited operations prevent users or applications from performing operations that may result in a deterministic failure, as described herein. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; user portal; and transaction processing.

The descriptions of the various aspects have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, by a management console managing a server, a request to perform an operation on the server, wherein the operation comprises a set of steps;
   determining that performance of the set of steps of the operation is associated with a deterministic failure in the server;
   determining that the deterministic failure is of a first class of deterministic failures, of a plurality of classes of deterministic failures; and
   blocking performance of the set of steps of the operation by the management console based on the first class of failure, thereby preventing an occurrence of the deterministic failure in the server.

2. The method of claim 1, wherein the operation is a system management operation, further comprising:
   prior to receiving the request:
      receiving an earlier request to perform the set of steps of the system management operation on the server;
      performing the set of steps of the system management operation on the server;
      determining that performing at least one step of the set of steps of the system management operation on the server causes the deterministic failure in the server;
      determining that the deterministic failure is of the first class of deterministic failures; and
      storing, by the management console, an indication that: (i) the system management operation is a prohibited operation, and (ii) the deterministic failure is of the first class of deterministic failures.

3. The method of claim 2, wherein the first class of the plurality of classes of deterministic failures comprises a cosmetic failure that does not generate incorrect results, wherein a second class of the plurality of classes of deterministic failures comprises a permanent failure that occurs for all input values provided to one of the set of steps of the operation, wherein a third class of the plurality of classes of deterministic failures comprises a recoverable failure that the server recovers from without operator intervention, wherein a fourth class of the plurality of classes of deterministic failures comprises an unrecoverable failure that requires restarting the server to correct the failure, wherein a fifth class of the plurality of classes of deterministic failures comprises a transient failure that occurs based on a set of input values provided to one of the set of steps of the operation, the method further comprising:
   sharing, by the management console managing the server, the indication with a second management console, wherein the second management console manages a second server.

4. The method of claim 3, further comprising:
   outputting, by the management console, an indication that performance of the operation has been blocked because the operation is associated with the first class of deterministic failure;
   outputting an indication that the first class of deterministic failure is the cosmetic failure; and
   responsive to receiving input specifying to perform the set of steps of the operation, performing the set of steps of the operation.

5. The method of claim 1, wherein determining that the operation is associated with the deterministic failure comprises:
   identifying, in a data store storing a set of prohibited operations, an entry associated with the operation.

6. The method of claim 5, further comprising:
   upon determining that performance of the operation no longer results in the deterministic failure, removing the entry associated with the operation from the data store.

7. The method of claim 1, wherein the operation is a system management operation, wherein the server is part of a computing cluster comprising a plurality of servers, wherein a plurality of management consoles manage a respective subset of the plurality of servers in the cluster, wherein the request is issued by at least one of: (i) a user, and (ii) a management application configured to provide high availability of the server in the cluster.

8. A system, comprising:
   a server; and
   a management console configured to manage the server, wherein the management console is configured to perform an operation comprising:
      receiving, by a management console managing a server, a request to perform an operation on the server, wherein the operation comprises a set of steps;
      determining that performance of the set of steps of the operation is associated with a deterministic failure in the server;
      determining that the deterministic failure is of a first class of deterministic failures, of a plurality of classes of deterministic failures; and
      blocking performance of the set of steps of the operation by the management console based on the first class of failure, thereby preventing an occurrence of the deterministic failure in the server.

9. The system of claim 8, wherein the operation is a system management operation, wherein the operation further comprises:
   prior to receiving the request:
      receiving an earlier request to perform the set of steps of the system management operation on the server;
      performing the set of steps of the system management operation on the server;
      determining that performing at least one step of the set of steps of the system management operation on the server causes the deterministic failure in the server;
      determining that the deterministic failure is of the first class of deterministic failures; and
      storing, by the management console, an indication that: (i) the system management operation is a prohibited operation, and (ii) the deterministic failure is of the first class of deterministic failures.

10. The system of claim 9, wherein the first class of the plurality of classes of deterministic failures comprises a cosmetic failure that does not generate incorrect results, wherein a second class of the plurality of classes of deterministic failures comprises a permanent failure that occurs for all input values provided to one of the set of steps of the operation, wherein a third class of the plurality of classes of deterministic failures comprises a recoverable failure that the server recovers from without operator intervention, wherein a fourth class of the plurality of classes of deterministic failures comprises an unrecoverable failure that requires restarting the server to correct the failure, wherein a fifth class of the plurality of classes of deterministic failures comprises a transient failure that occurs based on a set of input values provided to one of the set of steps of the operation, the operation further comprising:
 sharing, by the management console managing the server, the indication with a second management console, wherein the second management console manages a second server.

11. The system of claim 10, the operation further comprising:
 outputting, by the management console, an indication that performance of the operation has been blocked because the operation is associated with the first class of deterministic failure;
 outputting an indication that the first class of deterministic failure is the cosmetic failure; and
 responsive to receiving input specifying to perform the set of steps of the operation, performing the set of steps of the operation.

12. The system of claim 8, wherein determining that the operation is associated with the deterministic failure comprises:
 identifying, in a data store storing a set of prohibited operations, an entry associated with the operation.

13. The system of claim 12, the operation further comprising:
 upon determining that performance of the system management operation no longer results in the deterministic failure, removing the entry associated with the operation from the data store.

14. The system of claim 8, wherein the operation is a system management operation, wherein the server is part of a computing cluster comprising a plurality of servers, wherein a plurality of management consoles manage a respective subset of the plurality of servers in the cluster, wherein the request is issued by at least one of: (i) a user, and (ii) a management application configured to provide high availability of the server in the cluster.

15. A computer program product, comprising:
 a non-transitory computer-readable storage medium having computer-readable program code embodied therewith, the computer-readable program code comprising:
  computer-readable program code configured to receive, by a management console managing a server, a request to perform an operation on the server, wherein the operation comprises a set of steps;
  computer-readable program code configured to determine that performance of the set of steps of the operation is associated with a deterministic failure in the server;
  computer-readable program code configured to determine that the deterministic failure is of a first class of deterministic failures, of a plurality of classes of deterministic failures; and
  computer-readable program code configured to block performance of the set of steps of the operation by the management console based on the first class of failure, thereby preventing an occurrence of the deterministic failure in the server.

16. The computer program product of claim 15, wherein the operation is a system management operation, further comprising:
 computer-readable program code configured to, prior to receiving the request:
  receive an earlier request to perform the set of steps of the system management operation on the server;
  perform the set of steps of the system management operation on the server;
  determine that performing at least one step of the set of steps of the system management operation on the server causes the deterministic failure in the server;
  determine that the deterministic failure is of the first class of deterministic failures; and
  store, by the management console, an indication that: (i) the system management operation is a prohibited operation, and (ii) the deterministic failure is of the first class of deterministic failures.

17. The computer program product of claim 16, wherein the first class of the plurality of classes of deterministic failures comprises a cosmetic failure that does not generate incorrect results, wherein a second class of the plurality of classes of deterministic failures comprises a permanent failure that occurs for all input values provided to one of the set of steps of the operation, wherein a third class of the plurality of classes of deterministic failures comprises a recoverable failure that the server recovers from without operator intervention, wherein a fourth class of the plurality of classes of deterministic failures comprises an unrecoverable failure that requires restarting the server to correct the failure, wherein a fifth class of the plurality of classes of deterministic failures comprises a transient failure that occurs based on a set of input values provided to one of the set of steps of the operation, the computer program product further comprising:
 computer-readable program code configured to share, by the management console managing the server, the indication with a second management console, wherein the second management console manages a second server.

18. The computer program product of claim 17, further comprising:
 computer-readable program code configured to output, by the management console, an indication that performance of the operation has been blocked because the operation is associated with the first class of deterministic failure;
 computer-readable program code configured to output an indication that the first class of deterministic failure is the cosmetic failure; and
 computer-readable program code configured to, responsive to receiving input specifying to perform the set of steps of the operation, perform the set of steps of the operation.

19. The computer program product of claim 15, wherein determining that the system management operation is associated with the deterministic failure comprises:
 identifying, in a data store storing a set of prohibited operations, an entry associated with the operation.

20. The computer program product of claim 19, further comprising:

computer-readable program code configured to, upon determining that performance of the system management operation no longer results in the deterministic failure, remove the entry associated with the operation from the data store.

\* \* \* \* \*